Aug. 5, 1969   R. G. HOLMAN   3,459,425
FOOTBALL WITH GEODESIC WINDINGS
Original Filed Aug. 15, 1962   2 Sheets-Sheet 1

INVENTOR.
RUDOLPH G. HOLMAN
BY
ATTORNEY

Aug. 5, 1969    R. G. HOLMAN    3,459,425

FOOTBALL WITH GEODESIC WINDINGS

Original Filed Aug. 15, 1962    2 Sheets-Sheet 2

INVENTOR.
RUDOLPH G. HOLMAN
BY *Richard A. Joel*
ATTORNEY

United States Patent Office 3,459,425
Patented Aug. 5, 1969

3,459,425
FOOTBALL WITH GEODESIC WINDINGS
Rudolph George Holman, Santa Ana, Calif., assignor to
W. J. Voit Rubber Corp., a corporation of California
Original application Aug. 15, 1962, Ser. No. 221,927, now
Patent No. 3,317,146, dated May 2, 1967. Divided
and this application Apr. 19, 1966, Ser. No. 543,610
Int. Cl. A63b 41/00, 41/02, 41/12
U.S. Cl. 273—65    1 Claim

ABSTRACT OF THE DISCLOSURE

An athletic ball comprising a spheroidal bladder, a plurality of continuous reinforcing windings distributed over the surface of said spheroidal bladder in the form of a series of substantially geodesic curves, and an outer cover positioned over the reinforcing windings.

This is a division of application Ser. No. 221,927, filed Aug. 15, 1962 now U.S. Patent No. 3,317,146. This invention relates to the manufacture of athletic game balls and particularly to a new and improved type of football.

Footballs are approximately spheroidal in shape and may be considered as approaching ellipsoids. The configuration of a football may be formed by rotating a circular arc about its cord to form what has been previously referred to as a spheroid. Prior art footballs generally comprise an internal flexible and inflatable bladder of elastomeric material which is covered or wrapped with one or more layers of reinforcing material such as impregnated fabric sectors or a cord winding. The reinforcing material is usually bnoded to the bladder to achieve an integral arrangement. In a typical football, a plurality of sectors comprising the cover are applied over the reinforcement whether it be impregnated fabric sectors or a cord winding which is generally wrapped in helical form about the bladder from end to end thereof. The football also includes a valve for inflating the ball which extends through the reinforcing layers and the cover to the bladder.

Prior art footballs, however, have not been entirely satisfactory since the reinforcements have been non-uniform in one respect or another due to the fact that the fabric layers were overlapping or the helically wound cord layers which are applied along the longitudinal axis of the ball produce a ball which is reinforced only in a direction normal to the longitudinal axis. There is no or little reinforcement in the axial direction of a cord wound ball and furthermore, the ball reinforcement is non-uniform about the curvature of the ball surface. Consequently, the balls heretofore produced which include a reinforcing winding have not possessed the optimum characteristics of strength, durability and balance which are desirable in a product subject to severe conditions of use.

Accordingly, it is an object of this invention to provide a new and improved game ball having superior resilience, strength and durability.

Another object of this invention is to provide a new and improved football having an improved reinforcing winding positioned between the bladder and the outer cover.

A further object of this invention is to provide a new and improved football having an internal reinforcing winding which corresponds substantially to a plurality of geodesic curves.

A more specific object of this invention is to provide a football having a unique reinforcing winding comprising one or more separate cords which are wound about the bladder in a series of geodesic curves.

In accordance with the general features of this invention a new type of spheroidal game ball embodying the invention comprises an internal air-retaining bladder of a material such as rubber, an intermediate reinforcing layer, and an outer cover which may be applied integrally or in sectors over the reinforcing layer. The reinforcing layer comprises a cord of a material such as nylon which is wound about the spheroidal football in a series of geodesic curves.

The geodesic curves are essentially the shortest and straightest frontal lines which may be drawn through two points on the surface of the spheroid. One and only one geodesic arc can be drawn through any two points on a curved surface if they are not too far apart. Being the shortest lines means that every sufficiently small portion of a geodesic curve is the shortest path connecting the end points of the portion. Being the straightest lines means that at each of its points the geodesic lines have the smallest curvature among all the curves through the point that lies on the curved surface. The lines are considered frontal since they always move on an infinitesimal arc of the surface straight ahead.

Applicant has discovered a new type of football wherein the hollow bladder is reinforced by a cord winding which conforms substantially to the geodesic lines about the bladder. This winding may be carried out without slippage and without the necessity of anchoring the thread due to the fact that the windings are approximately geodesic curves. Since the resultant curves are of shorter length, the windings are uniform in tension and in their reinforcing capacity over the entire surface of the ball. This results in a product in which the internal radial stresses are uniformly contained by the winding and the finished football possesses superior and uniformly distributed resilience, strength and durability.

This new type of football may be produced by the method disclosed in the parent application Ser. No. 221,927, filed Aug. 15, 1962. In essence, the winding path describes a family of specific geodesic curves, each winding cycle producing three turns traversing twelve quadrants around the surface of the ball. This forms a double figure-eight about the bladder which bends over the equator of the ball. In order to produce a winding which provides uniform resistance to stress, the pattern is continuously varied by a small predetermined angle so that while each cycle conforms substantially to a geodesic curve, each successive cycle starts at a different angle. In a typical embodiment this angle ranges from about 10° to 80° with regard to the equator.

The distribution of the winding over the surface depends upon the rate of variation of the above angle which may be determined empirically. This type of path is not a true geodesic curve but a very close approximation of the geodesic curve. Such approximation produces that type of coverage of the bladder's surface which adjusts the distribution of turns to the distribution of stresses over the surface of the spheroid which is not uniform because of the asymmetry of of the spheroid. The resulting distribution is better than the distribution obtainable with ideal geodesic curves. These approximations will be referred to hereafter as "substantially geodesic curves" or "substantially geodesic paths."

Other objects and advantages of this invention will be apparent from the following detailed description when read in connection with the accompanying drawings wherein.

Figure 1:
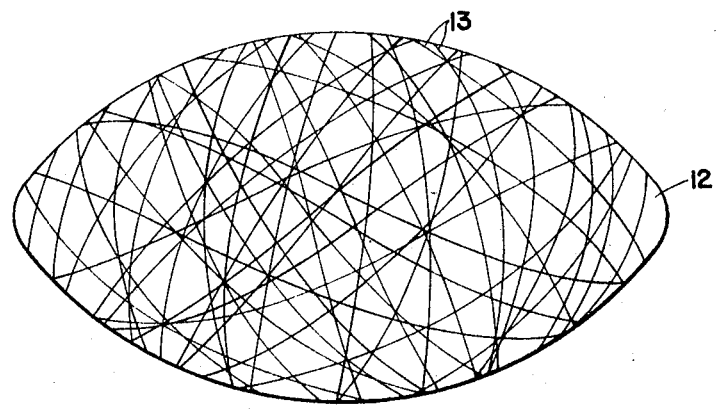
FIG. 1 is a side view of a new-type football with several turns of a single cord wound on the surface of a football bladder.
Figure 2:
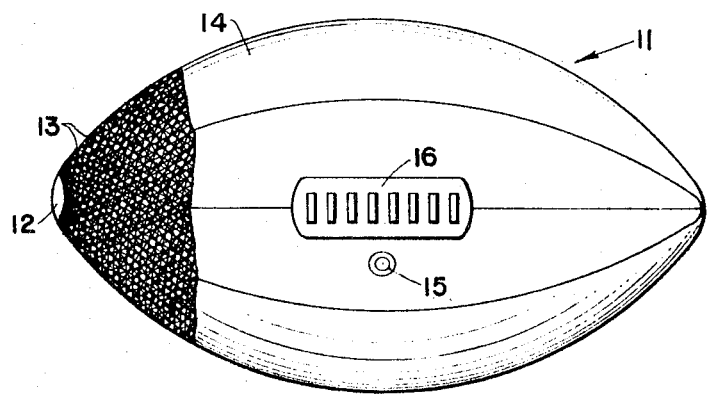
FIG. 2 is a side view of of a completed football with the cover removed at one end in order to illustrate the new type of winding.

Referring now to the drawings, the invention comprises a new and improved athletic game ball such as a football 11 having a substantially prolate spheroidal configuration. As shown in FIGS. 1 and 2, the football 11 includes an internal gas-retaining bladder 12 of a resilient flexible material such as rubber, an intermediate reinforcing layer or winding 13 and an outer wear-resistant cover 14.

The bladder 12 is formed in a conventional manner with a valve 15 extending through the surface thereof into the internal cavity for inflation purposes. The rubber bladder 12 serves as an air-retaining envelope for the ball 11 and, since the bladder lacks the necessary strength for rough use, a reinforcing layer 13 is required. While numerous reinforcements have been employed in the prior art, see Patent 2,688,488 to C. J. Crowley, the present invention discloses a unique reinforcing winding 13 comprising a plurality of geodesic curves. In essence, a nylon cord is applied about the bladder 12 in a series of substantially geodesic curves by the method and apparatus disclosed in applicant's co-pending application, Ser. No. 221,927, filed Aug. 15, 1962. Since geodesic lines are the shortest and straightest lines to be formed on the surface of the bladder, the windings 13 are uniform in tension and in their reinforcing capacity over the entire surface of the ball. The windings 13 therefore, will not slip while being wrapped about the bladder 12 and need not be bonded thereto though in some embodiments of the invention an adhesive may be used to further secure the windings to the bladder 12.

An outer cover 14 preferably of molded rubber or leather and comprising at least two sections is positioned about the wound bladder. The cover 14 may be constructed and applied in the manner described for example, in Patent 2,653,818 to H. E. Tebbets, Jr. et al. The sections are then permanently bonded or affixed together to form a unitary outer cover 14. The lacing 16 for the ball 11 may be molded to the cover or otherwise mounted thereto in the manner disclosed in Patent 2,687,303 to R. B. Henderson.

Figure 3A:
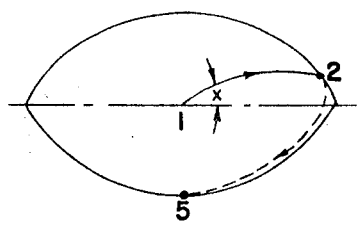
FIGS. 3a to 6 illustrate diagrammatically the winding of a complete cycle of geodesic curves about a spheroid with FIGS. 3a, 4a, 5a and 6 showing a side view of the ball and FIGS. 3b, 4b and 5b showing a front view thereof.
Figure 3B:
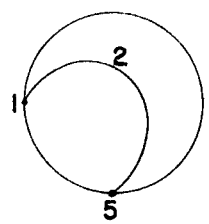
Figure 4A:
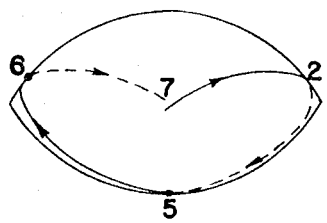
Figure 4B:
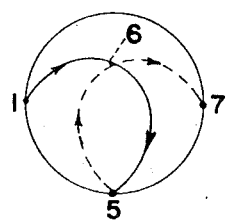
Figure 5A:
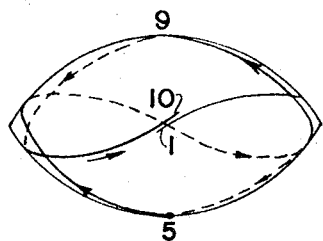
Figure 5B:
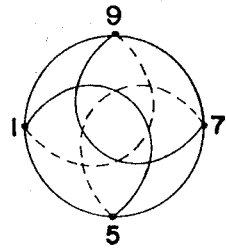

In greater detail, the invention comprises a football 11 having an internal bladder 12 surrounded by a plurality of reinforcing windings 13 in the form of geodesic curves. FIGURES 3a to 6 illustrate the application of a cord or cord windings 13 during a single complete winding cycle. FIG. 3a shows a curve utilizing an angle $x$ of approximately twenty-five degrees for purposes of illustration. The end of the cord 13 may be taped at the starting point 1 to hold it to the bladder 12. As the cord or thread is applied from point 1 to point 5 for a relatively small angle, the curve traverses nearly three quadrants. In a mechanized winding operation, the angle $x$ would be designed to change by a predetermined increment during each cycle. FIGS. 3a and 3b illustrate one-fourth of a complete winding cycle for a football while FIGS. 4a and 4b show one-half of a cycle. The winding continues from point 7 in FIGS. 4a and 4b for the second half of the cycle until the trace ends adjacent the original point 1, as shown in FIGS. 5a and 5b. Further winding will continue at the initial angle $x$ but the curves will intersect the equator of the ball at incrementally displaced points such as point 10. It should be noted that at points 1 and 7 the wind is at positive angles $x$, but at points 5 and 9 the angles are negative.

Figure 6:
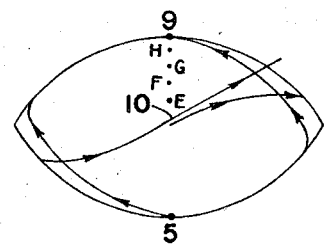

As the winding pattern continues through successive points on the equator as shown at E, F, G, H, etc. in FIG. 6 until point 9 is reached, the winds become crisscrossed, preventing slippage of the thread and adding two dimensional strength to the wind. The winding continues until the ball is provided with the desired properties. It may also be noted that one complete winding cycle is considered to be that which returns the cord to a point (point 10 in FIG. 6) adjacent the starting point (point 1) on the surface of the ball for each previous wind. Stated differently, one cycle is represented by that portion of the curve included within adjacent passages through the equatorial plane in the same direction. This cycle produces three complete revolutions of the cord about the surface of the ball 11.

The winding pattern follows the theoretical geodesic pattern so closely that extremely fine slippery thread of 100/2 nylon has been successfully applied to game balls without the use of adhesives and with very little tension. The spheroidal bladder 12 is not covered by the winding 13 at the extreme polar portions since complete coverage of these areas is difficult to accomplish and is not really necessary. The subject winding does, however, result in a reinforced football which possesses uniform and superior strength, resilience and durability. The football also exhibits improved dimensional uniformity, stability and balance.

It is to be understood that the above-described arrangements are simply illustrative examples of the application of the principles of the invention. Numerous other arrangements may be readily devised by those skilled in the art which will embody the principles of the invention and fall within the spirit and scope thereof.

What I claim as new is:

1. In a football having essentially a prolate spheroidal bladder, a reinforcing winding over said bladder, and an outer cover over said winding, the improvement of said winding comprising successive cycles of a filament of winding material over said bladder, said filament following the path of a substantially continuous geodesic curve over said bladder, said filament for each cycle thereof progressing over said bladder in the same clockwise direction and three times about said bladder when viewed from one end thereof, each cycle of said filament starting from a first point at one side of the bladder equator and extending therefrom along a path at an angle to the bladder's lengthwise axis upwardly toward and downwardly around one end of the bladder and then along the bladder toward the other end thereof so as to cross the equator of the bladder at a second point spaced 90 degrees downward from said starting first point, said filament continuing from said second point upwardly toward and downwardly around the other end toward said one end to a half cycle third point on said equator diametrically opposite said first starting point, said filament continuing from said half cycle third point downwardly toward said one end and upwardly around said one end so as to twice cross the previously wound filament at said one end and then continue along said bladder toward said other end so as to cross the equator at a fourth point diametrically opposite said second point, said filament continuing from said fourth point downwardly toward and upwardly around said other end so as to twice cross the previously wound filament at said other end and extend to a terminal fifth point on said equator adjacent said starting first point, said terminal fifth point being spaced from said starting first point and the filament continuing through said terminal fifth point at an angle to the bladder's lengthwise axis which is incrementally different from said first mentioned starting angle.

References Cited

UNITED STATES PATENTS

| | | | |
|---|---|---|---|
| 2,061,604 | 11/1936 | Winterbauer | 273—65 |
| 2,194,674 | 3/1940 | Riddell | 273—65 |
| 2,688,488 | 9/1954 | Crowley | 273—65 |

RICHARD C. PINKHAM, Primary Examiner